United States Patent [19]

Yokogawa et al.

[11] Patent Number: 5,051,836
[45] Date of Patent: Sep. 24, 1991

[54] OPTICAL DISC WITH PREGROOVES AND RECORDING METHOD AND APPARATUS USING AN OPTICAL DISC OF THAT TYPE

[75] Inventors: Fumihiko Yokogawa; Yoshihiro Utsumi, both of Saitama, Japan

[73] Assignee: Pioneer Electronic Corporation, Tokyo, Japan

[21] Appl. No.: 371,007

[22] Filed: Jun. 26, 1989

[30] Foreign Application Priority Data

Dec. 5, 1988 [JP] Japan ................................. 63-307151

[51] Int. Cl.⁵ ...................... G11B 7/007; G11B 7/095
[52] U.S. Cl. ................................ 358/342; 369/44.38; 369/275.1; 369/275.4
[58] Field of Search ..................... 360/36.1, 38.1, 26, 360/27; 358/337, 341, 342, 314, 320, 336; 369/44, 45, 60, 48, 47

[56] References Cited

U.S. PATENT DOCUMENTS

| | | | |
|---|---|---|---|
| 4,380,015 | 4/1983 | Ito et al. ............................. | 369/106 |
| 4,451,863 | 5/1984 | Yamagida et al. ................ | 369/44.14 |
| 4,460,926 | 7/1984 | Nakamuta .......................... | 358/326 |
| 4,535,366 | 8/1985 | Pullen ................................. | 358/335 |
| 4,555,734 | 11/1985 | Fukui .................................. | 358/337 |
| 4,707,816 | 11/1987 | Yonezawa et al. ............... | 369/44.36 |
| 4,750,163 | 6/1988 | Yamamiya et al. ................ | 369/54 |
| 4,761,692 | 8/1988 | Yoshida et al. ................... | 358/335 |
| 4,783,776 | 11/1988 | Ishigaki et al. .................... | 369/44 |
| 4,855,977 | 8/1989 | Getreuer et al. ................... | 369/32 |
| 4,866,688 | 9/1989 | Ohtake et al. ..................... | 369/44.28 |

OTHER PUBLICATIONS

Optical Memory Symposium, "Externally Synchronized Reproduction in an Optical Disc File", 1986, pp. 197-200.

*Primary Examiner*—Roy N. Envall, Jr.
*Assistant Examiner*—Huy Nguyen
*Attorney, Agent, or Firm*—Foley & Lardner

[57] ABSTRACT

An optical disc with pregrooves arranged circumferentially so as to define a track area, and recording method and apparatus using an optical disc of that type. The disc is characterized by horizontal sync signal formed regions in which the pregrooves are formed in an intermittent manner along a circumference. The recording method and apparatus are characterized by performing a recording operation by irradiating a recording light beam modulated by a video format signal on a track area of an optical disc with pregrooves, generating a sync pulse signal having pulses corresponding to the horizontal sync signal forming area, from an electric signal obtained by a photo-electric conversion of a reflection signal from the optical disc, detecting the phase difference between the sync pulse signal and a horizontal sync pulse signal in the video format signal, and delaying the video format signal in accordance with the magnitude of the phase difference.

20 Claims, 5 Drawing Sheets

OPTICAL DISC WITH PREGROOVES AND RECORDING METHOD AND APPARATUS USING AN OPTICAL DISC OF THAT TYPE

BACKGROUND OF THE INVENTION

1. Field of the Invention

The present invention relates to an optical disc and a recording method, and more specifically to an optical disc of the writable type with pregrooves and a recording method and apparatus using an optical disc of that type.

2. Description of Background Information

A recording method has already been developed by which an FM modulated video format signal is recorded on an optical disc with pregrooves, so as to enable the recording and reproduction of pictures with motion. In such a conventional recording method, a vertical sync signal is recorded on the disc beforehand. During the recording of the video format signal the vertical sync signal is read-out from the disc, so that the rotational speed of the disc is controlled in response to the phase difference between the vertical sync signal obtained from the disc and the vertical sync signal in the video format signal to be recorded.

However, since the vertical sync signal is recorded every half a revolution of the disc, there has been the problem that the eccentricity of the disc and the fluctuation of the rotation of the spindle motor cause errors of in the linear velocity, so that the time error becomes large at the boundary between fields or frames of the video format signal. This time error generated at the boundary between fields or frames becomes as large as 0.16H (1H is 64μs) when the eccentricity is 50 μm, the rotational speed is 1800 rpm, and the distance between the center of rotation and the position of irradiation of the light beam for writing information is 55 millimeter.

Therefore, apparatuses for reproducing information recorded on the disc on which the video format signal is recorded by the above described conventional recording system have needed a complex device for preventing disturbances of image caused by a malfunction of a circuit for compensating the time base error or the like, such as a device disclosed in a research paper titled "Efficient Synchronization of Play Back Video with External Video Sync in Recordable Optical Disc," printed in the digest of technical papers of Optical Memory Symposium '86, pp 197-200.

OBJECT AND SUMMARY OF THE INVENTION

The present invention has been made in view of the point described above, and an object of the present invention is therefore to provide a recording method and apparatus in which the generation of time error at the boundary between fields or the boundary between frames is surely prevented.

In the recording method according to the present invention, a disc with pregrooves is used on which the pregrooves are arranged circumferentially, defining a track area, and horizontal sync signal forming regions are provided where the pregrooves are formed intermittently in the circumferential direction. For the recording operation in which a recording light beam modulated by the video format signal is irradiated in the track area of the optical disc with pregrooves, a sync pulse signal corresponding to the horizontal sync signal forming regions is derived from an electric signal which is obtained by a photo-electric conversion of a reflected light from the disc, a phase difference is detected between the sync pulse signal and a horizontal sync signal in the video format signal, and the video format signal is delayed in accordance with the detected phase error.

DETAILED DESCRIPTION OF THE PREFERRED EMBODIMENT

The embodiment of the present invention will be explained with reference to the accompanying drawings hereinafter.

Figure 1:
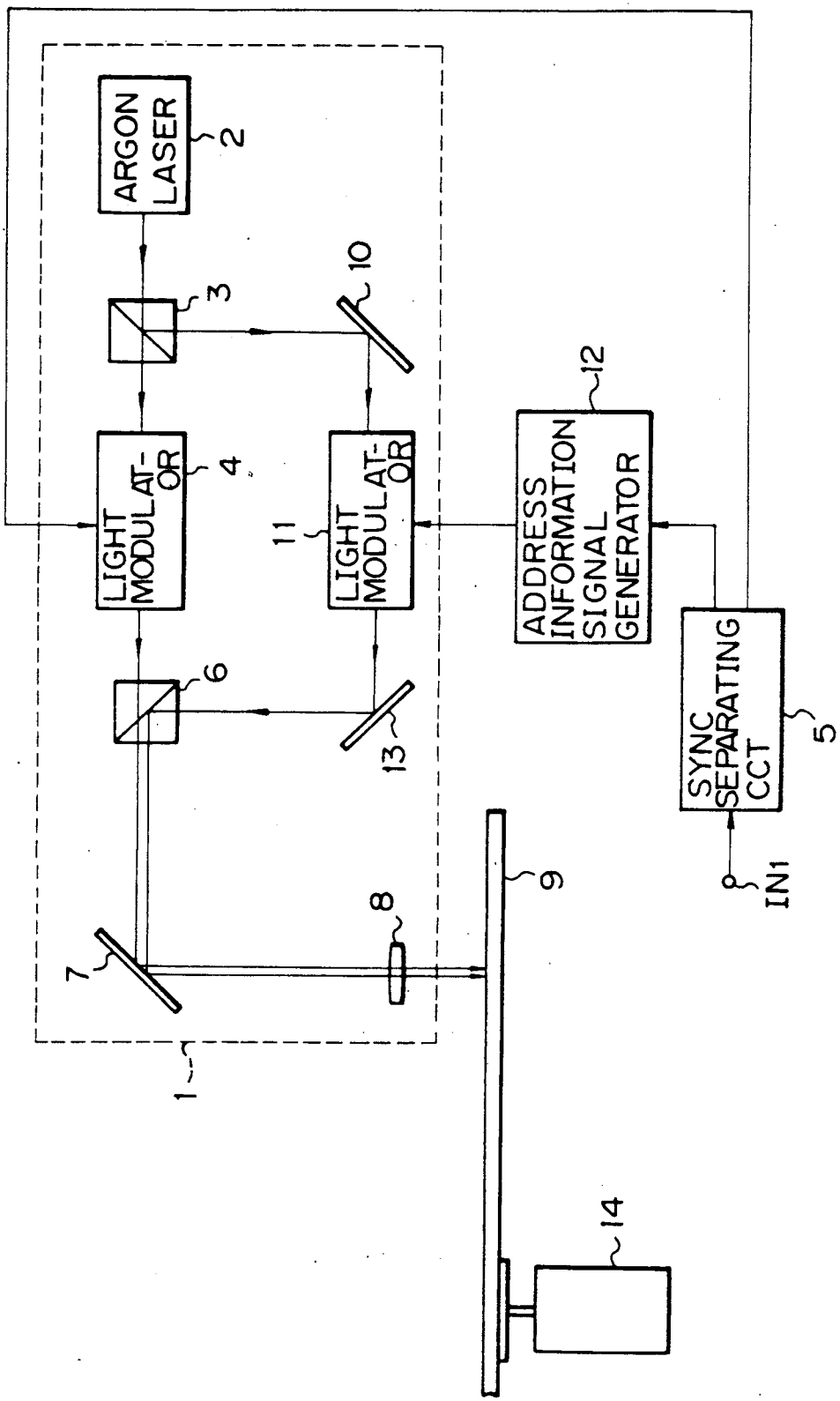
FIG. 1 is a block diagram showing an apparatus for forming pregrooves, pre-address-pits, and so on, on a master disc.

As shown in FIG. 1, a laser beam emitted from an Argon laser tube 2 is split into two beams by a beam splitter 3, in an optical head generally denoted by 1. One of these two beams is a beam for producing grooves designated as pregrooves or bumps for the tracking control, and the other is a beam for producing pits designated as prepits, which bear address information. The beam for producing the pregrooves is incident into a light modulator 4. A horizontal sync signal which is separated, by a separating circuit 5, from a video format signal or a composite sync signal supplied at an input terminal $IN_1$ is supplied to the light modulator 4. The light modulator 4 is such that its light transmission factor is varied by the horizontal sync signal, so that the beam for producing pregrooves is modulated in intensity by the horizontal sync signal.

The beam for producing pregrooves which has been modulated at the light modulator 4 is reflected by a reflection mirror after passing through a beam splitter 6, and directed to a convergent lens 8. By means of the convergent lens 8, the beam is converged on the recording surface of a master disc 9, to form a light spot having a diameter of about $1_{82}$ m for exposing the photo resist material forming the recording surface.

The beam for producing the address-pits which has been split by the beam splitter 3 is reflected by a reflecting mirror 10, and is incident into a light modulator 11. The apparatus includes an address information generating circuit 12, and its output signal is supplied to the light modulator 11. The address information signal generating circuit 12 receives a vertical sync signal which is separated, by the separating circuit 5, from the video format signal or the composite sync signal supplied to the input terminal $IN_1$.

The address information signal generating circuit 12 is, for example, configured to generate a signal corresponding to data representing the frame number in synchronism with the vertical sync signal.

In the light modulator 11, the light transmission factor is changed by the output signal of the address information generating circuit 12, and the beam for producing pre-address-pits is modulated in intensity by the output signal of the address information signal generating circuit 12. The beam for producing the pre-address-pits modulated by the light modulator 1 is reflected by the a reflection mirror 13, the beam splitter 6, and the reflection mirror 7, and directed to the convergent lens 8. By the convergent lens 8, the beam is converged on the recording surface of the master disc 9, for example, as a light spot having a diameter of about 1μm, which exposes the photo resist material forming the recording surface. The relative position of the reflection mirror 13, beam splitter 6, and other optical elements is determined so that the light spot of the beam for producing the pre-address-pits and the light spot of the beam for producing pregrooves are spaced apart from each other by a predetermined distance x in a radial direction of the master disc 9.

The master disc 9 is rotated by a motor 14 and a spindle servo loop (not shown), for example, at a rate of one frame per revolution on the basis of the vertical sync signal. Furthermore, the optical head 1 is moved in a radial direction by a motor and a servo loop (both not shown) for driving a carriage member on which the pickup is mounted, at a rate twice the predetermined distance x per one revolution. Furthermore, the position of the convergent lens 7 is controlled by a focus servo loop so that the laser beam is converged on the recording surface of the master disc 9. Though various servo loops mentioned above are provided in the apparatus, they are not illustrated in the figure since those servo loops are well known in the art.

Figure 2A:
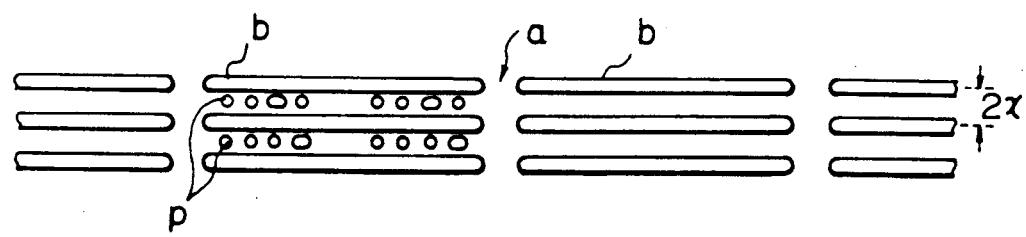
FIGS. 2A through 2C are diagrams showing a disc having pregrooves, pre-address-pits, and so on, produced by the apparatus shown in FIG. 1.
Figure 2B:
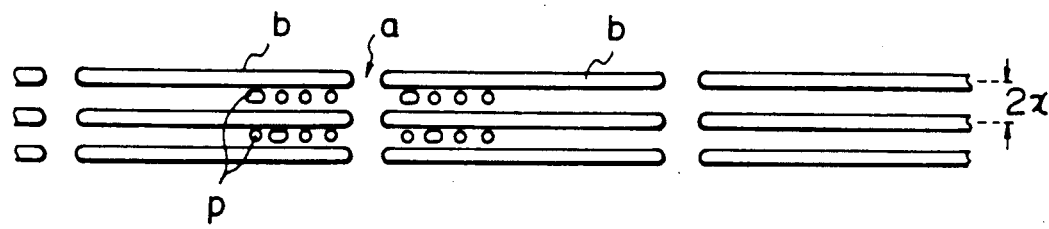
Figure 2C:
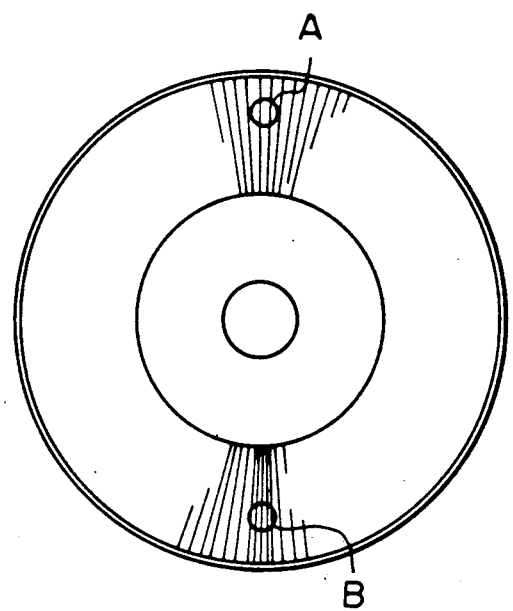

In the arrangement described above, the intensity of the beam for producing pregrooves is reduced in response to the horizontal sync signal. Therefore, on the recording surface of the master disc, pregrooves are produced in a spiral form, which consist of a plurality of unit grooves b linearly arranged along a direction of the elongation with mirror portions a corresponding to the sync tip level position of the horizontal sync signal, as illustrated in FIGS. 2A and 2B. FIGS. 2A and 2B are enlarged views respectively illustrating two portions of the master disc shown in FIG. 2C, which are located symmetrically with respect to the disc center.

The light spot of the beam for producing the pre-address-pits and the light spot of the beam for producing the pregrooves are arranged in a radial direction on the master disc, so that the light spots are spaced apart by a predetermined distance. Furthermore, the intensity of the beam for producing pre-address-pits is varied in response to address data which is generated in synchronism with the vertical sync signal. Therefore pre-address-pits p are formed in the video signal recording area between the pregrooves every half a revolution of the master disc.

When the information reading light is irradiated on a recording disc obtained from the master disc described above, the intensity of the light from the recording surface of the disc is varied by the mirror portions a, so that the horizontal sync frequency component is contained in the read signal. Furthermore, a signal according to the address information is obtained from the read signal every half a revolution of the disc by using the pre-address-pits p. Therefore, the vertical sync signal can be generated from this signal according to the address information.

Metal molds, each called a "stamper", are made from the master disc described above, and reproduction discs called "replica" are produced by pressing the stamper against a piece of plastic. A predetermined information bearing layer is formed on the replica and the information bearing surface is then coated with a protective layer so that, for example, magneto-optical discs for the recording are produced FIG. 3 is a block diagram of a recording and reproducing apparatus for recording a video format signal on such a disc and reproducing it from the disc.

Figure 3:
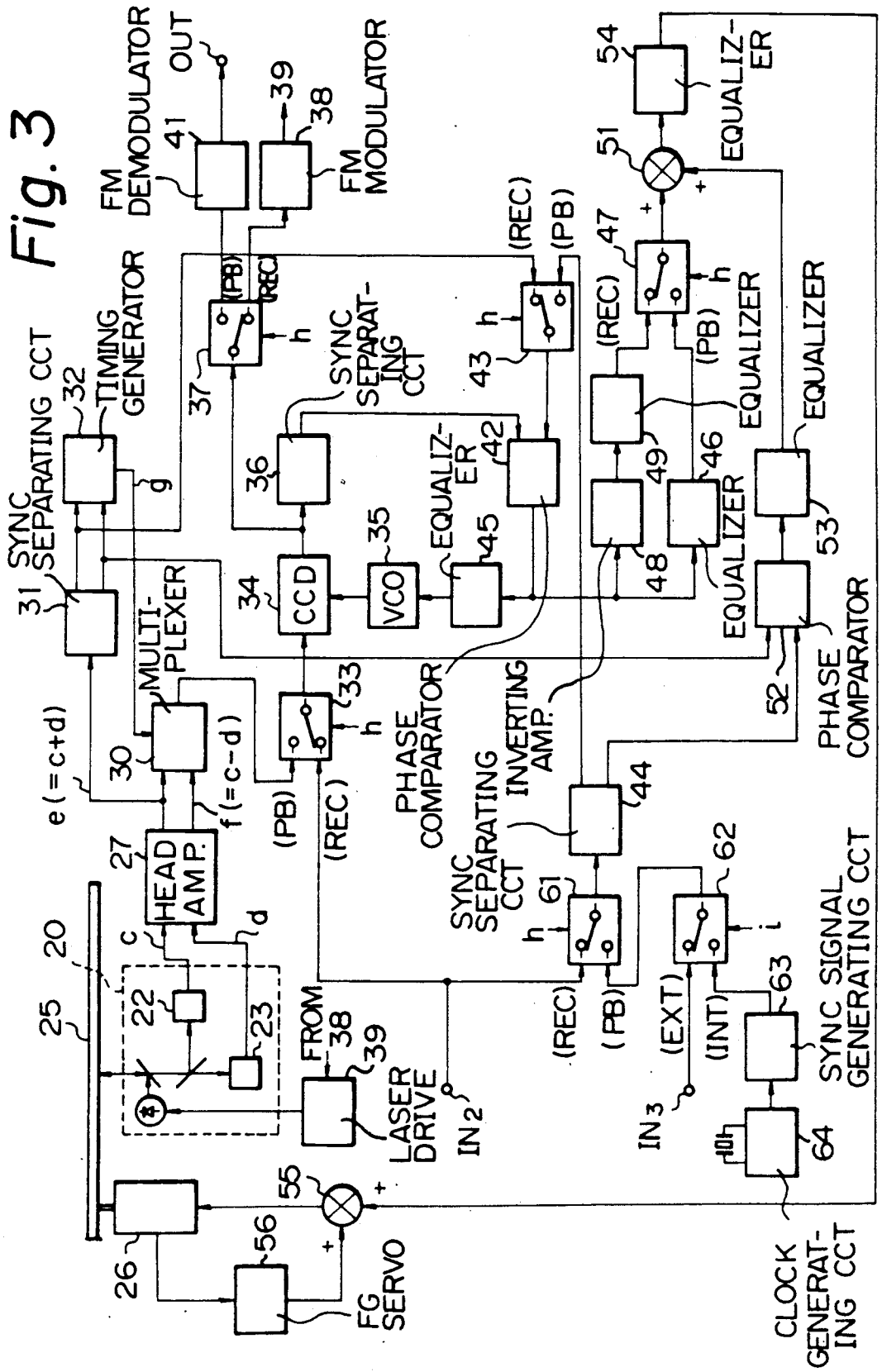
FIG. 3 is a block diagram showing an apparatus for recording and reproducing a video format signal on and from the disc shown in FIGS. 2A and 2B.

In FIG. 3, the reference numeral 20 denotes a magneto-optical pickup in which a laser diode 21 as a light source, and photo detector elements 22 and 23 that receive lights of both channels of a differential optical system and perform an photo-electric conversion operation are incorporated. The photo detector elements 22 and 23 are provided for detecting, for instance, a laser beam emitted by a laser diode 21 and reflected by the recording surface of a disc 25, respectively through an analyzer. One of the photo detector elements 22 and 23 is arranged to detect a component of the Kerr rotation angle in a positive direction and the other is arranged to detect a component of the Kerr rotation angle in a negative direction. Rotation of the disc 25 is performed by a spindle motor 26.

The pickup 20 further incorporates therein a focus actuator and a tracking actuator. These two actuators are respectively driven by a focus servo circuit and a tracking servo circuit. With the operation of these actuators, focus servo circuit and tracking servo circuit, the laser beam emitted from the laser diode 21 is accurately focused on the recording surface of the disc 25, forming a beam spot. This beam spot is relatively moved with respect to the disc along a pregroove, as a result of the rotation of the disc 25. Since these two actuators, the focus servo circuit, and the tracking servo circuit are not necessary for the explanation of the invention, those parts are omitted in FIG. 3.

Output signals c and d of the photo detector elements 22 and 23 are supplied to a head amplifier 27. The head amplifier 27 includes an adder for adding the output signals c and d of the photo detector elements 22 and 23, and a subtraction circuit for subtracting one of the output signals c and d of the photo detector elements 22 and 23 from the other, and constructed to provide a summing signal e output by the adder and a subtraction signal output f by the subtraction circuit. The address information which is previously recorded as pre-address-pits and the horizontal sync signal which is previously recorded by means of pregrooves are obtained by the summing signal e, and information recorded by the magneto-optical recording operation is obtained by the subtraction signal f.

The summing signal e is supplied to a multiplexer 30 and a sync separating circuit 31. The sync separating circuit 31 is configured to generate a vertical sync signal using the address information signal in the summing signal e and provide it as a reproduced vertical sync signal, and to separate the horizontal sync signal in the summing signal e according to the pregrooves, and provide it as the reproduced horizontal sync signal. The reproduced vertical sync signal and reproduced horizontal sync signal output from the sync separating circuit 31 are supplied to a timing generator 32. The timing generator 32 is configured to detect periods in which the address information can be obtained from the summing signal e by using the reproduced horizontal sync signal and the reproduced vertical sync signal, and generate a timing signal g which exists during the detected periods. The output signal of the timing generator 32 is supplied to the multiplexer 30. The multiplexer is configured to selectively output the summing signal e during the presence of the timing signal g, and output the subtraction signal f when the timing signal g is not present. Therefore, a signal obtained by inserting the address information signal into the FM signal recorded on the disc 25 by the magneto-optical recording operation is provided from the multiplexer 30. The output signal of the multiplexer 30 is supplied to a second stationary contact (PB) of a change-over switch 33. A recording video format signal input through an input terminal $IN_2$ is supplied a first stationary contact (REC) of the change-over switch 33. From a control circuit (not shown) a switch control signal h is supplied to a control input terminal of the change-over switch 33. The change-over switch 33 is configured so that the movable contact comes contact with the first stationary contact (REC) during the recording mode, and to the second stationary contact (PB) during the playback mode.

The signal derived at the movable contact of the change-over switch 33 is supplied to a Charge Coupled Device (CCD) 34. A clock pulse signal output from a Voltage Controlled Oscillator (VCO) 35 is supplied to the CCD 34. By the CCD 34, the output signal of the change over switch 33 is delayed by a time corresponding to an instantaneous frequency of the clock pulse, and supplied to the sync separating circuit 36 and to the movable contact of the change-over switch 37.

The change-over switch 37 is, like the change-over switch 33, configured so that its movable contact is in contact with the first stationary contact (REC) during the recording mode, and the movable contact is in contact with the second stationary contact (PB) during the playback mode, in response to a change-over control signal from a control circuit (not shown). The signal derived at the first stationary contact of the change-over switch 37 is supplied to an FM modulator 38 where a modulation process is performed. An FM signal output from the FM modulator 38 is supplied to the laser diode 21 in the pickup 20 through a laser drive circuit 39. Consequently, the power of laser of the laser diode 21 is varied in response to the FM signal, so that the magneto-optical recording is performed.

The signal derived at the second stationary contact (PB) of the change-over switch 37 is supplied to an FM demodulator 41, where the video format signal is demodulated. The demodulated video format signal is supplied to a video signal output terminal OUT.

In the sync separating circuit 36, the horizontal sync signal is separated from the output signal of the CCD 34, and in turn supplied to a phase comparator circuit 42. In the phase comparator circuit 42, phase comparison is performed between the horizontal sync signal separated from the output signal of the CCD 34 (referred to as delayed horizontal sync signal hereinafter) and the horizontal sync signal derived at the movable contact of a change-over switch 43, and a phase difference signal according to the phase difference between these two signals is generated. To the first stationary contact (REC) of the change-over switch 43, the delayed horizontal sync signal is supplied. A reference horizontal sync signal output from the sync separating circuit 44 is supplied to the second stationary contact (PB) of the change-over switch 43. The change-over switch 43 is, like the change-over switch 33, configured so that its movable contact is in contact with the first stationary contact (REC) during the recording mode, and the movable contact is in contact with the second stationary contact (PB) during the playback mode, by a control signal from the control circuit (not shown).

The output signal of the phase comparator 42 is supplied to an equalizer 45 as the time base error signal, where the phase compensation is effected, and in turn supplied to the VCO 35 as a control signal. With this construction, the signal delay time in the CCD 34 is controlled so that the phase difference between the delayed horizontal sync signal and the horizontal sync signal output from the change-over switch 43 becomes equal to a predetermined phase difference value.

The output signal of the phase comparator circuit 42 is supplied to the second stationary contact (PB) of a change-over switch 47 through the equalizer 46, and to the first stationary contact (REC) of the change-over switch 47 through an inverting amplifier 48, and an equalizer 49. The change-over switch 47 is, like the change-over switch 33, configured so that its movable contact is in contact with the first stationary contact (REC) during the recording mode, and the movable contact is in contact with the second stationary contact (PB) during the playback mode.

The error signal derived at the movable contact of the change-over switch 47 is supplied to one of the input terminals of an adder circuit 51. To the adder circuit 51, an error signal issued from the phase comparator circuit 52 with its phase compensation is performed by an equalizer 53 is supplied as the other input signal. The output signal of this adder circuit 51 is, after a phase compensation is effected at an equalizer 54, supplied to a summing circuit 55 where it is combined, by the summation, with an output signal of an FG servo circuit 56. The output signal of the summing circuit 55 is supplied to the spindle motor 26 as a driving signal. The spindle motor 26 incorporates therein a frequency generator which generates an FG signal having a frequency corresponding to the rotational speed of the spindle motor 26, and the FG signal issued from this frequency generator is supplied to an FG servo circuit 56. The FG servo circuit 56 is configured to generate a signal having a level corresponding to the frequency of the FG signal, for example by differentiating the FG signal, to compare the level of the generated signal with the level of a reference level signal, and to output a signal corresponding to the level difference, as an error signal. By means of this FG servo circuit 56, the rotational speed of the spindle motor 26 is controlled to be equal to a predetermined rotational speed.

In the phase comparator circuit 52, a phase comparison operation is performed between the reference vertical sync signal output from the sync separating circuit 44 and the reproduced vertical sync signal output from the sync separator circuit 31, and a signal corresponding to the phase difference between the reference and reproduced vertical sync signals is generated and in turn issued as an error signal. A signal derived at the movable contact of the change-over switch 61 is supplied to the sync separating circuit 44. The recording video format signal supplied at the input terminal $IN_2$ is supplied to a first stationary contact (REC) of the change-over switch 61. On the other hand, the signal derived at the movable contact of the change-over switch 62 is supplied to the second stationary contact (PB) of the change-over switch 61. To a first stationary contact of the change-over switch 62, there is supplied a reference video format signal or a reference composite sync signal from the outside, through an input terminal $IN_3$. A composite sync signal issued from the sync signal generating circuit 63 is supplied to a second stationary contact (INT) of the change-over switch 62. The sync signal generating circuit 63 is configured to generate the composite sync signal in accordance with a clock pulse issued from the clock generating circuit 64, for example consisting of a quartz oscillator. The change-over switch 61 is, like the change-over switch 33, configured so that its movable contact is in contact with the first stationary contact (REC) during the recording mode, and it is in contact with the second stationary contact (PB) during the playback mode by means of a change-over control signal h from the control circuit (not shown). On the other hand, the changeover switch 62 is configured so that its movable contact is in contact with the first stationary contact (EXT) during the external synchronization mode, and it is in contact with the second stationary contact (INT) during the internal synchronization mode, in response to a change-over control signal from the control circuit (not shown).

In the apparatus having the construction explained above, the operation of the change-over switches 33, 37, 47, and 61 are such that their movable contacts are in contact with their first contacts (REC) respectively in the recording mode. Consequently, the recording video format signal is supplied to the sync separating circuit 44 through the change-over switch 61, and the vertical sync signal separated from the recording video format signal is supplied to the phase comparator circuit 52 as the reference vertical sync signal. In the phase comparator circuit 52, the phase comparison is performed between the reproduced vertical sync signal read-out from the disc 25 and the reference vertical sync signal, and the error signal corresponding to the detected phase difference is generated. This error signal is added to the drive signal of the spindle motor 26, the disc 25 is rotated in a manner that the timing of the period in which the beam spot formed on the disc 25 scans the vertical sync signal recording portion is synchronized with the vertical sync signal of the video format signal.

At the same time, the recording video format signal is supplied to the CCD 34 by the change-over switch 33, and the horizontal sync signal separated from the recording video format signal delayed by the CCD 34 is supplied to the phase comparator circuit 42 as a delayed horizontal sync signal. In this state, since the reproduced horizontal sync signal is supplied to the phase comparator circuit 42 by the change-over switch 43, the error signal is generated in accordance with the phase difference between the horizontal sync signal in the delayed video format signal and the horizontal sync signal read-out from the disc 25. Since an inverted signal of this error signal is added to the drive signal of the spindle motor 26, the disc 25 is rotated in a manner that the timing of the period in which the beam spot formed on the disc 25 scans the horizontal sync signal recording portion is synchronized with the horizontal sync signal in the video format signal.

The error signal output from the phase comparator circuit 42 is supplied to the control input terminal of the VCO 35 through the equalizer 45, the video format signal is delayed by means of this CCD 34 by a period corresponding to the phase difference between the horizontal sync signal in the video format signal and the horizontal sync signal recorded as the pregrooves of the disc 25. Therefore, even if the speed of the relative movement of the beam spot formed on the disc 25 with respect to the disc 25 is varied for example by the eccentricity of the disc, the time base of the video format signal is varied in response to this change in the relative speed. Therefore, the continuity of the video format signal recorded on the disc 25 is maintained.

In the playback mode, the movable contacts of the change-over switches 33, 37, 43, 47, and 61 are in contact with their second stationary contacts (PB) respectively. As a result, the output signal of the change-over switch 62 is supplied to the sync separating circuit 44. The output signal of the change-over switch 62 is the reference video format signal or the reference composite sync signal both supplied from the outside in the external synchronizing mode. In the internal synchronizing mode, the output signal of the change-over switch 62 is the internal composite sync signal output from the sync signal generating circuit 63. The vertical signal separated from the output signal of the change-over switch 62 is supplied to the phase comparator circuit 52 as the reference vertical sync signal.

In the phase comparator circuit 52, the phase comparison is performed between the reproduced vertical sync signal read-out from the disc 25 and the reference vertical sync signal, and an error signal is generated in accordance with the result of the comparison. Since this error signal is added to the drive signal of the spindle motor 26, the disc 25 is rotated in a manner such that the timing of the period in which the beam spot formed on the disc 25 scans the vertical sync signal recording portion is synchronized with the vertical sync signal in any one of the reference video format signal, the reference composite sync signal, and the internal composite sync signal.

At the same time, the output signal of the multiplexer 30, that is, the read signal obtained by the pickup 20 is supplied to the CCD 34 through the change-over switch 33. By the CCD 34, the read signal is delayed and the horizontal signal separated from the delayed read signal is supplied to the phase comparator circuit 42 as a delayed horizontal sync signal. At this time, the reference horizontal sync signal is supplied to the phase comparator circuit 42 through the change-over switch 43, an error signal corresponding to the phase difference between the horizontal sync signal in the delayed read signal and the reference horizontal sync signal. Since this error signal is supplied to the drive signal of the spindle motor 26 by the change-over switch 47, the disc 25 is rotated so that the horizontal sync signal in the read signal is synchronized with the reference horizontal sync signal. In addition, since the read signal is supplied to the FM demodulation circuit 41 after the time base correction is performed by the CCD 34, the video format signal without any time base error can be obtained.

Figure 5:
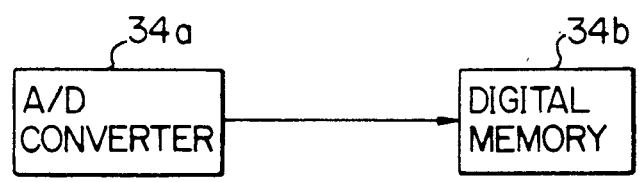
FIG. 5 is a block diagram showing an alternate delay element.

In the embodiment described above, a CCD is used as the delay element of the video format signal, however, this is not limitative and another method, such as a combination of A/D converter 34a and digital memory 34b as shown in FIG. 5, can be also utilized.

Figure 4:
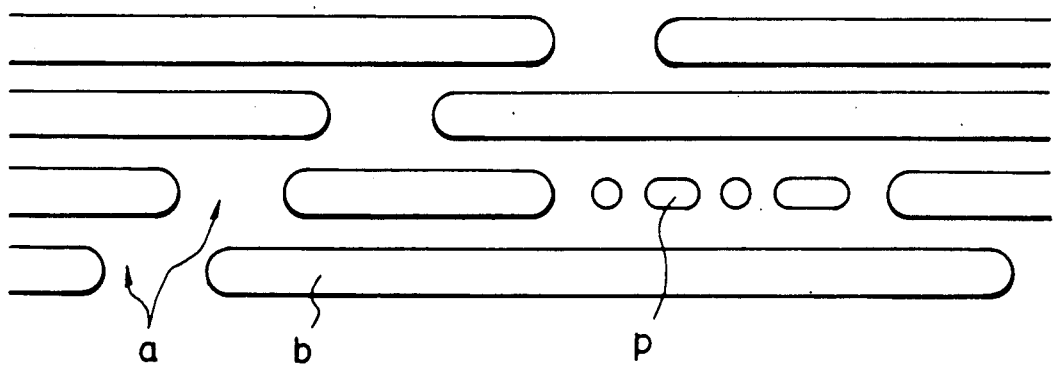
FIG. 4 is a diagram showing the arrangement of pregrooves and pre-address-pits on a CLV disc according to the present invention.

FIG. 4 shows an example where the present invention is adopted in a CLV type disc. In this case, the recording region is formed on the same circumferences as the pregrooves. With this arrangement, the master disc producing process can be simplified. Specifically, the two beams shown in FIG. 1, respectively for generating the pregrooves and address pits, are irradiated in a manner that the two beams are spaced apart by a particular distance in the circumferential direction. The timing of the optical modulation is off-set between these two beams so that the time difference corresponding to the positional difference of the two beams is compensated. In the example illustrated, the width of the pre-address-pits is determined to be smaller than that of the pregrooves. However, in a case where it is not necessary to make the widths of the address pits and the pregrooves different from each other, the pre-address-pits and the pregrooves can be formed by using a single beam.

The present invention has been explained by way of example in which the video format signal is recorded and reproduced on and from a magneto-optical disc permitting the rewrite of recorded information. However, it is to be noted that the present invention is applicable to the case where the video format signal is recorded on a write-once type optical disc with which writing of information can be performed one time while the rewrite of the information is not possible.

As explained in detail in the foregoing, the recording method and apparatus according to the present invention use an optical disc with pregrooves, the pregrooves being elongated in a circumferential direction, to define the track region, and the optical disc including horizontal sync signal forming regions in which the pregrooves are formed intermittently in the circumferential direction. In the recording operation while the recording light beam modulated by the video format signal is irradiated on the track region of the optical disc with pregrooves, a sync pulse signal corresponding to the above horizontal sync signal forming region is generated from the electric signal obtained by the photo-electric conversion of the reflection light from the optical disc, and a phase difference is detected between the sync pulse signal and the horizontal sync signal in the video format signal, and the video format signal is delayed in response to the phase difference. Therefore, in the recording method and apparatus according to the present invention, even if the relative speed of the movement of light spot of the pickup for the writing and reading of information is varied by the eccentricity of the disc for example, the time base of the recording video format signal is varied in response to the variation in the relative speed. Thus, the continuity of the video format signal to be recorded on the disc is secured. Therefore, the recorded video format signal can be reproduced with good quality by using a playing apparatus having a simple construction.

What is claimed is:

1. An optical disc comprising:
   an optical recording surface;
   a plurality of pregrooves circumferentially locate din said recording surface defining a track, with plural ones of said pregrooves located in an intermittent manner along a given circumference; and
   a plurality of horizontal sync signal forming regions, said regions consisting of mirror portions on said recording surface.

2. An optical disc as claimed in claim 1, wherein said mirror portions on said recording surface along said circumference.

3. An optical disc as claimed in claim 1, wherein each of said pregrooves is substantially longer than the dimension of an information pit along a length of said track.

4. An optical disc as claimed in claim 1, wherein address information pre-pits are located in said track.

5. An optical disc as claimed in claim 1, wherein address information pre-pits are located in said circumference between successive ones of said pregrooves.

6. A system for recording an information format signal upon a recording medium having a pre-recorded horizontal sync signal, said system comprising:
   means for supplying said information format signal as an input information format signal including an input horizontal sync signal;
   means for deriving said pre-recorded horizontal sync signal from said recording medium; and
   means, responsive to said means for supplying and said means for deriving, for recording said input information format signal upon said recording medium in accordance with a transfer characteristic controlled in response to a phase difference between said input horizontal sync signal and said pre-recorded horizontal sync signal.

7. A system as claimed in claim 6, wherein said recording medium comprises an optical disc comprising:
   an optical recording surface;
   a plurality of pregrooves circumferentially located in said recording surface defining a track, with plural ones of said pregrooves located in an intermittent manner along a given circumference; and
   a plurality of horizontal sync signal forming regions located along said circumference.

8. A system as claimed in claim 6, wherein:
   said transfer characteristic comprises a time delay; and
   said means for recording comprises delay mans for delaying said input information format signal in accordance with said time delay to produce a delayed information format signal.

9. A system as claimed in claim 8, wherein said delay means comprises a charge coupled device.

10. A system as claimed in claim 8, wherein said means for recording comprises:
    means for separating said input horizontal sync signal from said delayed information format signal to produce a separated horizontal sync signal;
    means for comparing said separated horizontal sync signal with said prerecorded horizontal sync signal to produce said phase difference; and
    means for controlling said delay means in accordance with said phase difference to adjust said time delay.

11. A system as claimed in claim 8, wherein said delay means comprises:
    means for converting said input information format signal into a corresponding digital information format signal; and
    digital memory means for storing said corresponding digital information format signal for delayed readout as said delayed information format signal.

12. A system as claimed in claim 11, wherein said means for converting comprises an analog to digital converter.

13. A system as claimed in claim 6, wherein said means for recording comprises:
    means for supplying a light beam;
    means for modulating said light beam with said information format signal to produce a modulated light beam; and
    means for irradiating said modulated light beam upon said recording medium.

14. A system as claimed in claim 13, wherein said light beam is a laser light beam.

15. A system as claimed in claim 14, wherein said means for deriving comprises:

detector means for providing a composite signal from said recording medium including said pre-recorded horizontal sync signal; and means for separating said prerecorded horizontal sync signal from said composite signal.

16. A system as claimed in claim 15, wherein:

said recording medium is an optical disc providing a reflection signal; and said detector means converts said reflection signal into said composite signal.

17. A system as claimed in claim 16, wherein said detector means comprises:

first means for detecting a Kerr rotation angle component in a positive direction from said reflection signal and converting said component in a positive direction into a first electrical signal;

second means for detecting a Kerr rotation angle component in a negative direction from said reflection signal and converting said component in a negative direction into a second electrical signal; and means for adding said first electrical signal and said second electrical signal to form said composite signal.

18. A system as claimed in claim 6, wherein said information format is a video format.

19. A method for recording information upon a recording medium having a pre-recorded horizontal sync signal, comprising the steps of:

supplying an input signal comprising said information input signal including an input horizontal sync signal;

generating a sync pulse signal from said pre-recorded horizontal sync signal; and transferring said input signal for recording upon said recording medium in accordance with a phase difference between said input horizontal sync signal and said sync pulse signal.

20. A method as in claim 17, wherein:

said input signal i a video format signal;

said recording medium is an optical disc having a circumference including pregrooves defining a track area adjacent thereto, said circumference including regions having said pre-recorded horizontal sync signal; and said transferring step includes the steps of modulating said video format signal upon a light beam to form a modulated light beam and irradiating said modulated light beam upon said track area to record said information.

* * * * *